No. 652,904. Patented July 3, 1900.
G. STROH.
HOSE COUPLING.
(Application filed July 16, 1898.)
(No Model.)
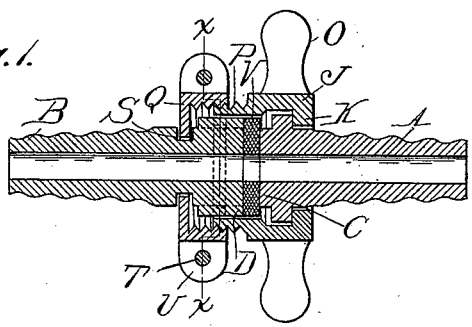
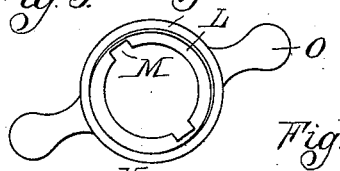
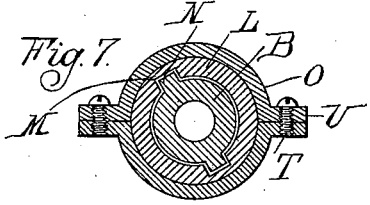
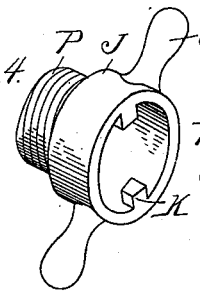
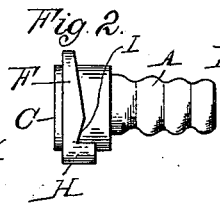
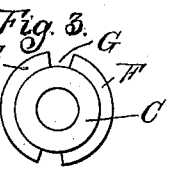
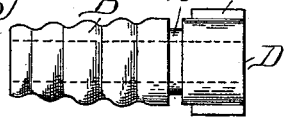
Witnesses:
Otto F. Barthel
V. D. Kinner
Inventor:
George Stroh,
By Adolph Barthel
Attorney.

UNITED STATES PATENT OFFICE.

GEORGE STROH, OF DETROIT, MICHIGAN.

HOSE-COUPLING.

SPECIFICATION forming part of Letters Patent No. 652,904, dated July 3, 1900.

Application filed July 16, 1898. Serial No. 686,121. (No model.)

*To all whom it may concern:*

Be it known that I, GEORGE STROH, a citizen of the United States, residing at Detroit, in the county of Wayne and State of Michigan, have invented certain new and useful Improvements in Hose-Couplings, of which the following is a specification, reference being had therein to the accompanying drawings.

This invention is especially designed for coupling-hose intended to carry fluid under a high pressure where it is difficult to make a tight joint with the couplings in ordinary use, and, further, to provide against any possibility of accidental uncoupling, as often results from the hose being turned or twisted in handling it.

To this end the invention consists in the peculiar construction, arrangement, and combination of parts, all as more fully hereinafter described, and shown in the annexed drawings, in which—

Figure 1 is a vertical longitudinal section of my hose-coupling in its coupled condition. Fig. 2 is a detached elevation of the male member of the coupling. Fig. 3 is an end elevation of Fig. 2. Fig. 4 is a detached perspective view of the coupling-sleeve of the female member of the coupling. Fig. 5 is an elevation of the rear end of the coupling-sleeve. Fig. 6 is an elevation of the female member of the coupling-sleeve, omitting the coupling-sleeve and its adjusting-nut. Fig. 7 is a cross-section on line $x\,x$, Fig. 1.

A and B are the two coupling members, formed at their outer ends with suitable nipple connections for the attachment of the hose and having at their inner ends enlarged heads terminating in annular seats C and D. The member A is provided with two segmental screw cam-flanges E and F, forming between them openings G G. Each cam-flange is provided at its end with an offset or shoulder H, (an offset on one flange, however, will be sufficient,) and near this offset the screw-face of the flange is cut away to form a reverse inclined or cut-away portion I. The member B carries the coupling-sleeve J, which at its front end is interiorly provided with coupling-lugs K and at its rear end with an inwardly-projecting flange L, in which are formed one or more guide-grooves M, and the head of the member B is formed with corresponding lugs N, whereby the coupling-sleeve is prevented from turning, but is free to slide longitudinally on the head of the member B. The coupling-sleeve is provided with projections or handles O, and its rear end is exteriorly screw-threaded, as at P, to engage with an interior screw-thread of the nut Q. This nut Q has an interiorly-projecting flange R, engaging loosely into an annular groove S in the member B, whereby it can be turned freely thereon, and thereby project or retract the coupling-sleeve J, according to the direction in which it is turned. This nut is made in halves for the purpose of securing it in position upon the member B, and the halves are formed with lugs, through which the screws or rivets T pass to secure the halves together and form suitable wings U for facilitating the turning.

V is a packing-ring on the seat of the coupling member B.

In practice to make a coupling the head of the member A is introduced into the coupling-sleeve in proper position to pass the coupling-lugs K through the openings G, and then by a partial turn of one or both members the lugs K are compelled to engage with the cam-flanges E F until the coupling-lugs prevent a further turning by striking against the offsets or stops H, and if the coupling-lugs cannot be forced so far the nut Q is turned to project the coupling-sleeve sufficiently to permit it to be done. In this manner both coupling-lugs K can be so finely seated on the reduced or relieved portions I of the coupling-flanges that no accidental uncoupling is possible by the mere twisting of the hose, as it would be if the flanges E F would have a uniform pitch.

The amount necessary to be cut away to effect the object of preventing accidental unlocking depends upon circumstances. For fire-hose or hose carrying fluid under high pressure the depression is preferably formed by a reverse screw-thread, which affords a safe lock and is not liable to injury or wear, and the faces of the coupling-lugs may be formed corresponding to that of the reverse thread or depression. The spirit of my invention, however, is intended to include any degree of cutting away of the cam-flanges as may be required by circumstances. Thus a mere flattening may be sufficient for ordinary purposes.

The nut Q serves as an adjusting device irrespective of the construction of the cam-flanges. It permits of adjusting the coupling-sleeve to compensate for any wear which may take place between the parts or which may be required to adjust it for different thicknesses of packing, and it will be understood that my coupling admits of being used without requiring the coöperation of the nut Q in coupling, provided the nut is so adjusted that the coupling-lugs properly coöperate with the cam portions of the flanges E and F. Thus it is entirely at the option of the operator to dispense with the locking feature of the coupling if circumstances should not make it necessary.

The handles O and wings U permit the operator to readily exert his force to any degree necessary to couple or uncouple the parts.

What I claim as my invention is—

1. In a coupling, the combination of two coupling members, one provided with cam-flanges having cut-away portions and the other carrying a coupling-sleeve upon it having a longitudinal sliding engagement therewith and provided with interior coupling-lugs, and a nut upon said coupling member held in position thereon against endwise displacement, said nut being free to turn upon said coupling member and having a screw-thread engagement with the coupling-sleeve on said member.

2. In a hose-coupling, the combination of two coupling members, one provided with cam-flanges terminating in stops and having cut-away portions adjacent thereto, and the other coupling member carrying a coupling-sleeve held in position thereon from turning—free to slide longitudinally thereon—and provided with interior coupling-lugs, a packing-ring inclosed in said coupling-sleeve, and a nut upon said coupling member held in position thereon against endwise displacement—free to turn thereon, said nut having an interior screw-thread engaging with an exteriorly-screw-threaded portion of the coupling-sleeve.

3. In a hose-coupling, the combination of two tubular members having at one end means for attaching the hose thereto and at the other end an enlarged head terminating in an annular seat, interrupted screw-flanges terminating in stops or offsets on the head of one of said members, depressions formed in said flanges adjacent to the stops, a coupling-sleeve J having a sliding connection on the head of the other member and a screw-nut Q turning loosely on said member and having a screw-thread engagement with the coupling-sleeve.

In testimony whereof I affix my signature in presence of two witnesses.

GEORGE STROH.

Witnesses:
M. B. O'DOGHERTY,
OTTO F. BARTHEL.